US011189920B2

(12) United States Patent
Liu et al.

(10) Patent No.: US 11,189,920 B2
(45) Date of Patent: Nov. 30, 2021

(54) CONTROL SUBSTRATE, LIQUID CRYSTAL PHASE SHIFTER AND METHOD OF FORMING CONTROL SUBSTRATE

(71) Applicant: BOE TECHNOLOGY GROUP CO., LTD., Beijing (CN)

(72) Inventors: Zongmin Liu, Beijing (CN); Mengjun Hou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/826,059

(22) Filed: Mar. 20, 2020

(65) Prior Publication Data

US 2021/0083378 A1  Mar. 18, 2021

(30) Foreign Application Priority Data

Sep. 18, 2019 (CN) .......................... 201910881072.4

(51) Int. Cl.
*H01Q 3/36* (2006.01)
*G02F 1/133* (2006.01)
*G09G 3/36* (2006.01)
*H01P 1/18* (2006.01)

(52) U.S. Cl.
CPC ........... *H01Q 3/36* (2013.01); *G02F 1/13306* (2013.01); *G09G 3/3696* (2013.01); *H01P 1/184* (2013.01); *G09G 2310/0289* (2013.01)

(58) Field of Classification Search
CPC ....... H01Q 3/36; H01P 1/184; G02F 1/13306; G09G 3/3696; G09G 2310/0289
USPC ......................................................... 349/193
See application file for complete search history.

(56) References Cited

U.S. PATENT DOCUMENTS

| 7,545,234 | B2 | 6/2009 | Chou |
| 2004/0119562 | A1 | 6/2004 | Sakano |
| 2008/0088388 | A1 | 4/2008 | Kormanyos |
| 2020/0343635 | A1 | 10/2020 | Hu et al. |
| 2021/0080765 | A1* | 3/2021 | Hu .................. G02F 1/1337 |

FOREIGN PATENT DOCUMENTS

| CN | 1508903 A | 6/2004 |
| CN | 1728454 A | 2/2006 |
| CN | 106410380 A | 2/2017 |

(Continued)

OTHER PUBLICATIONS

First Office Action for Chinese Application No. 201910881072.4, dated Dec. 23, 2020, 8 Pages.

*Primary Examiner* — Nathanael R Briggs
*Assistant Examiner* — William D Peterson
(74) *Attorney, Agent, or Firm* — Brooks Kushman P.C.

(57) ABSTRACT

A shift register unit, a shift register, a gate driving circuit and a display device are provided. The control substrate, comprising a base substrate, at least one microwave transmission line and at least one voltage loading line on the base substrate, wherein the at least one microwave transmission line is in a one-to-one correspondence to the at least one voltage loading line, and an end of the at least one voltage loading line is connected to the corresponding microwave transmission line, where the at least one voltage loading line and the at least one microwave transmission line are made of a same metal material, and the at least one voltage loading line is a planar inductor.

14 Claims, 4 Drawing Sheets

(56) References Cited

FOREIGN PATENT DOCUMENTS

| | | | |
|---|---|---|---|
| CN | 106532198 | A | 3/2017 |
| CN | 108803096 | A | 11/2018 |
| CN | 110350272 | A | 10/2019 |

\* cited by examiner

CONTROL SUBSTRATE, LIQUID CRYSTAL PHASE SHIFTER AND METHOD OF FORMING CONTROL SUBSTRATE

CROSS-REFERENCE TO RELATED APPLICATION

This application claims priority to Chinese Patent Application No. 201910881072.4 filed on Sep. 18, 2019, which is incorporated herein by reference in its entirety.

TECHNICAL FIELD

The present disclosure relates to the field of signal transmission technology, and in particular to a control substrate, a liquid crystal phase shifter, and a method of forming the control substrate.

BACKGROUND

Phase shifter is a device that can adjust the phase of electromagnetic waves. It is widely used in radar, missile attitude control, accelerator, communication, instrumentation and other fields.

The liquid crystal phase shifter is a new type of phase shifter that currently appears. By applying different voltages on both sides of the liquid crystal, the liquid crystal molecules of the liquid crystal layer are deflected with the electric field to change the dielectric constant of the liquid crystal, thereby affecting the electromagnetic wave transmission speed to achieve the electromagnetic wave phase shift.

The liquid crystal phase shifters in the related art usually use indium tin oxide (ITO) with higher resistance as the bias voltage loading line for the liquid crystal layer, and copper (Cu) as the phase shift transmission line for electromagnetic waves, so as to ensure that the microwave signal is mainly transmitted on the phase shift transmission line with high conductivity without leaking too much into the bias voltage loading line.

In the liquid crystal phase shifter with the above structure, since the bias voltage loading line and the microwave transmission line are made of different materials, therefore, when the liquid crystal phase shifter is formed, the control substrate at one side of the liquid crystal layer for arranging the bias voltage loading line and microwave transmission line is made by at least two patterning processes, which makes the forming process of the control substrate complex.

SUMMARY

A control substrate is provided in the present disclosure, including a base substrate, at least one microwave transmission line and at least one voltage loading line on the base substrate, where the at least one microwave transmission line is in a one-to-one correspondence to the at least one voltage loading line, and an end of the at least one voltage loading line is connected to the corresponding microwave transmission line;

the at least one voltage loading line and the at least one microwave transmission line are made of a same metal material, and the at least one voltage loading line is a planar inductor.

Optionally, a line width of the at least one microwave transmission line is more than a hundred times larger than a line width of the at least one voltage loading line.

Optionally, a line width of the planar inductor is less than or equal to 6 um.

Optionally, the planar inductor includes a plurality of portions connected end to end and parallel to each other, and a line spacing between two portions is less than or equal to 4 um.

Optionally, the planar inductor includes a polygonal line with at least 3 vertices.

Optionally, a corner between two segments of the polygonal line of the planar inductor is: 90 degrees or 135 degrees.

Optionally, the end of the at least one voltage loading line is connected to the corresponding microwave transmission line via a starting end, a middle or a corner of the corresponding microwave transmission line.

Optionally, an end of a segment of the at least one voltage loading line is connected to the corresponding microwave transmission line, and the segment is perpendicular to the corresponding microwave transmission line.

Optionally, a thickness of the at least one microwave transmission line is identical to a thickness of the at least one the voltage loading line.

Optionally, the metal material of the at least one voltage loading line and the at least one microwave transmission line comprises at least one of Cu, Ag and Al.

A liquid crystal phase shifter is further provided in the present disclosure, including the control substrate hereinabove.

Optionally, the liquid crystal phase shifter further includes:
a counter substrate opposite to the base substrate, where a phase-control electrode is on the counter substrate; and
a liquid crystal layer between the counter substrate and the base substrate.

A method of forming the control substrate hereinabove is further provided in the present disclosure, including:
providing a base substrate;
forming a metal material layer on the base substrate; and
patterning the metal material layer through one patterning process, to form the at least one voltage loading line and the at least one microwave transmission line.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative work.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person of ordinary skill in the art based on the described embodiments of the present disclosure fall within the scope of the present disclosure.

In order to clearly explain the specific structure of the control substrate according to the embodiment of the present disclosure, the structure and working principle of the liquid crystal phase shifter applied to the control substrate according to the present disclosure are described below.

Figure 1:
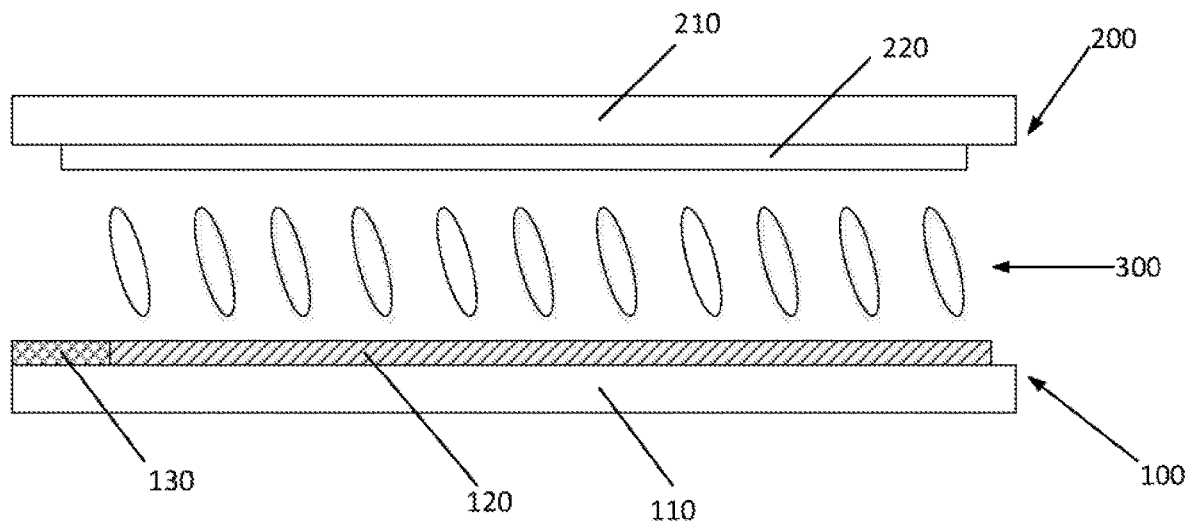
FIG. 1 is schematic cross-sectional view of a liquid crystal phase shifter in some embodiments of the present disclosure.

FIG. 1 is a schematic cross-sectional view of a liquid crystal phase shifter in some embodiments of the present disclosure. The liquid crystal phase shifter includes a first control substrate 100, a second control substrate 200, and a liquid crystal layer 300 between the first control substrate 100 and the second control substrate 200.

The first control substrate 100 includes a first base substrate 110, and a microwave transmission line 120 and a voltage loading line 130 disposed on one side of the first base substrate 110 facing the liquid crystal layer 300. The voltage loading line 130 and the microwave transmission line 120 are electrically connected. The second control substrate 200 includes a second base substrate 210 and a phase control electrode 220 disposed on one side of the second base substrate 210 toward the liquid crystal layer 300.

The first base substrate 110 and the second base substrate 210 are configured to support and accommodate the liquid crystal layer 300. The voltage loading line 130 is configured to apply a voltage signal to the microwave transmission line 120. When voltages are applied to microwave transmission line 120 and the phase control electrode 220 opposite to each other, an electric field is formed between the microwave transmission line 120 and the phase control 220 due to a voltage difference. The liquid crystal molecules in the liquid crystal layer 300 are deflected under the action of the electric field, so that the dielectric constant c of the liquid crystal layer 300 is changed.

Furthermore, according to the correspondence between the transmission speed v of the microwave signal and the dielectric constant ε: $v=c/\underline{\varepsilon}$, where c is the transmission speed of the microwave signal under vacuum conditions. When a microwave signal is transmitted on the microwave transmission line 120, the dielectric constant c of the liquid crystal layer 300 where the microwave transmission line 120 is located changes, which causes the transmission speed v of the microwave signal to change. Since the transmission length of the microwave transmission line 120 carrying the microwave signal is fixed, different transmission speeds v of the microwave signal can make the phases of the transmitted microwave signal different, thereby achieving the phase shift of the microwave signal.

In the embodiment of the present disclosure, a TN type liquid crystal with low loss, and high change rate of dielectric constant c change rate may be used to make a liquid crystal phase shifter. In view of the process feasibility of the liquid crystal cell and the loss of the microwave signal transmission, the current thickness of the liquid crystal layer is usually about 100 um.

Since the microwave transmission line 120 and the voltage loading line 130 need to be fabricated on the first control substrate 100 at the same time, and the voltage loading line 130 is connected to the microwave transmission line 120 to apply a voltage signal to the microwave transmission line 120, therefor, to avoid the leakage of the microwave signal from the microwave transmission line 120 to the voltage loading line 130 has become the focus of the first control substrate 100 structure design.

In order to avoid the leakage of microwave signals from the microwave transmission line 120 to the voltage loading line 130 in the related art, indium tin oxide ITO with large resistance is usually used as the voltage loading line, and copper Cu is uses as the microwave transmission line of electromagnetic wave, which leads to the complex process of the control substrate.

A control substrate, a liquid crystal phase shifter and a method of forming the control substrate are provided in the embodiments of the present disclosure. In addition to avoiding the leakage of microwave signals from the microwave transmission line to the voltage loading line on the control substrate of the liquid crystal phase shifter, the manufacturing process may be simplified.

A control substrate is provided in some embodiments of the present disclosure. The voltage loading line and the microwave transmission line may be made of a same metal material. By making the voltage loading line as a planar inductor, the leakage of microwave signals from the microwave transmission line to the voltage loading line may be avoided. In addition to avoiding the leakage of microwave signals from the microwave transmission line to the voltage loading line on the control substrate of the phase shifter, the manufacturing process may be simplified.

The microwave signal transmitted on the microwave transmission line 120 is a modulated signal carrying useful information. For example, a Ku-band satellite communication signal is transmitted, and usually has a frequency of about 12 GHz, which is a high-frequency AC signal.

Figure 2:
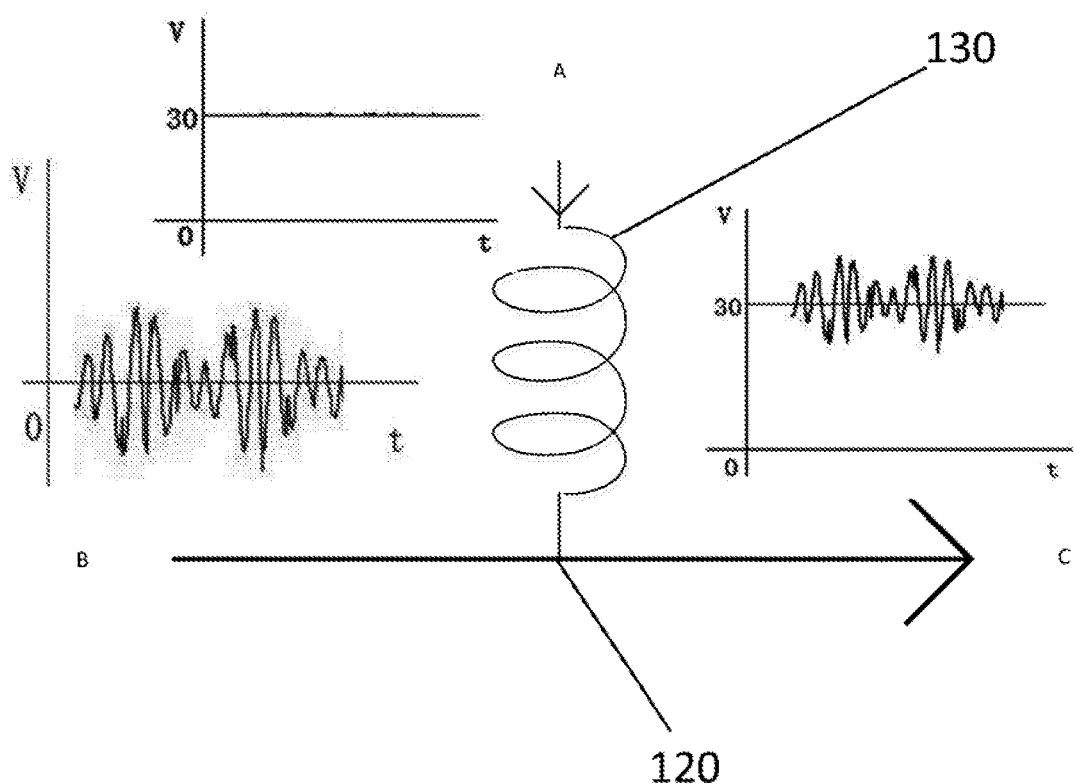
FIG. 2 is a schematic circuit model for illustrating a connection relationship between a voltage loading line and a microwave transmission line.

In some embodiment of the present disclosure, as shown in the schematic circuit model shown in FIG. 2, the voltage loading line 130 is a radio frequency choke with an inductive characteristic, and the inductor has the characteristics of passing DC and blocking AC. The voltage loading line 130 can provide a DC voltage signal to the microwave transmission line 120 and can prevent the microwave signal on the microwave transmission line 120 from leaking to the voltage loading line.

Referring to FIG. 1, the control substrate may be the first control substrate 100 in a liquid crystal phase shifter, including a first base substrate 110, and a microwave transmission line 120 and a voltage loading line 130 disposed on one side of the first base substrate 110, an end of the at least one voltage loading line 130 is connected to the corresponding microwave transmission line 120, where the voltage loading line 130 and the microwave transmission line 120 are made of a same metal material, and the voltage loading line 130 is a planar inductor.

It should be noted that the microwave transmission line and the voltage loading line are provided in a one-to-one correspondence in the present disclosure, and the number of microwave transmission lines and voltage loading lines is not limited.

In the embodiment of the present disclosure, in order to realize the blocking function of the voltage loading line 130 for the transmission of AC signals, optionally, the voltage loading line 130 has a high impedance characteristic. Specifically, the high-impedance characteristic of the voltage loading line 130 can be achieved by reducing the cross-sectional area of the voltage loading line 130.

Optionally, in some embodiment of the present disclosure, the line width of the transmission line 120 is more than a hundred times larger than the line width of the voltage loading line 130 to ensure the high impedance of the voltage loading line 130.

In addition, in order to realize the characteristics of passing DC and blocking AC of the voltage loading line 130, the voltage loading line is made as a planar inductor. The line width of the planar inductor is less than or equal to 6 um. The planar inductor includes a plurality of portions connected end to end and parallel to each other, and a line spacing between two portions is less than or equal to 4 um. The planar inductor comprises a polygonal line with at least 3 vertices. The corner between two segments of the polygonal line of the planar inductor is: 90 degrees or 135 degrees.

It should be noted that when determining the number of planar inductor polygonal line, the line width and the distance between adjacent polygonal line. It is necessary to consider the issue of process feasibility and ensure that there is a small coupling between adjacent polygonal line. On the basis of satisfying the above range, the parameters need to be determined according to the specific process conditions.

Figure 3:
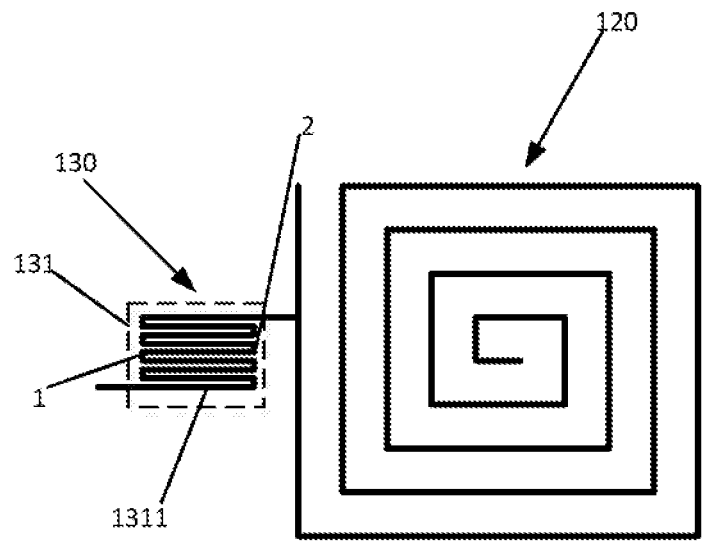
FIG. 3 is a first embodiment for illustrating a connection structure between a voltage loading line and a microwave transmission line.

As shown in FIG. 3, it is a schematic plan view of a microwave transmission line 120 and a voltage loading line 130 in a control substrate according to an embodiment of the present disclosure.

In this embodiment, the voltage loading line 130 is connected to the microwave transmission line 120, and the voltage loading line 130 is made as a planar inductor 131.

The planar inductor 131 includes a plurality of parallel polygonal lines 1311 that are parallel to each other. Specifically, among the multiple polygonal lines 1311, a first end of one of the polygonal lines is connected to a polygonal line adjacent to the first side through a first connection line 1, and a second end is connected to a polygonal line adjacent to the second side through a second connection line 2.

The first connection line 1 and the second connection line 2 are both perpendicular to one of the polygonal lines, and the first side is opposite to the second side.

According to the above mentioned embodiment, a plurality of polygonal lines 1311 are connected in series in order to form a planar inductor, and a plurality of polygonal lines 1311 connected in series are configured as a line path.

Further, in this embodiment, among a plurality of polygonal line 1311 connected in series, the first sub-loading line at the end of the series connection extends to the microwave transmission line 120, and the second sub-loading line at the beginning of the series connection extends to the voltage Input.

The end of the at least one voltage loading line is connected to the corresponding microwave transmission line via a starting end, a middle or a corner of the corresponding microwave transmission line.

Figure 4:
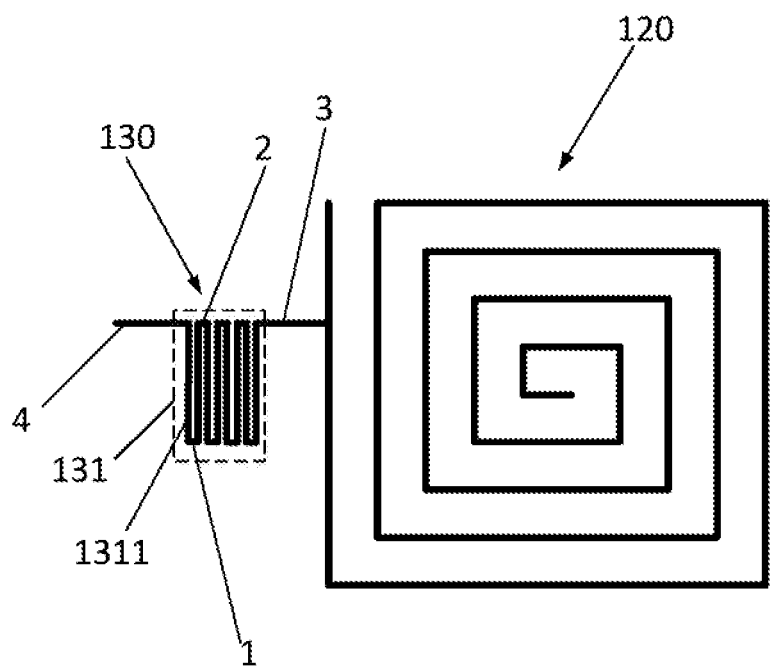
FIG. 4 is a second embodiment for illustrating a connection structure between a voltage loading line and a microwave transmission line.

As shown in FIG. 3, the microwave transmission line 120 is formed in a curved return shape, one end of which is located in the center, and the entire microwave transmission line 120 surrounds the end outwardly. The connection position of the voltage loading line 130 and the microwave transmission line 120 is close to the end of the microwave transmission line 120 far from the center. Optionally, a portion where the microwave transmission line 120 is connected to the first fold line at the end of the series connection is perpendicular to the first fold line As shown in FIG. 4, it is a schematic plan view of the microwave transmission line 120 and the voltage loading line 130 on the control substrate according to another embodiment of the present disclosure.

In this embodiment, similar to the above embodiment, the voltage loading line 130 is connected to the microwave transmission line 120, and the voltage loading line 130 is made as a planar inductor 131.

The planar inductor 131 includes a plurality of parallel polygonal lines 1311 that are parallel to each other. Specifically, among the multiple polygonal lines 1311, a first end of one of the polygonal lines is connected to a polygonal line adjacent to the first side through a first connection line 1, and a second end is connected to a polygonal line adjacent to the second side through a second connection line 2.

The first connection line 1 and the second connection line 2 are both perpendicular to one of the polygonal lines, and the first side is opposite to the second side.

Different from the embodiment shown in FIG. 3, in the embodiment shown in FIG. 4, among a plurality of polygonal lines 1311 connected in series, the first polygonal line at the end of the series connection is connected to the microwave transmission line 120 through the third connection line 3, there is a first angle between the third connection line 3 and the first polygonal line. Among the multiple polygonal lines 1311 connected in series, the second sub-loading line at the beginning of the series connection is connected to the voltage input terminal through the fourth connection line 4, there is a second angle between the fourth connection line 4 and the second sub-loading line.

Optionally, the first angle and the second angle are less than or equal to 90 degrees and greater than 0 degrees. In the embodiment of the present disclosure, as shown in FIG. 4, the first angle and the second angle are both equal to 90 degrees.

Referring to FIG. 4, optionally, the third connection line 3 and the fourth connection line 4 are located on the same straight line. Among them, the planar inductor 131 is located between the third connection line 3 and the fourth connection line 4. Each polygonal line 1311 is formed so that the length extension direction is perpendicular to the third connection line 3 and the fourth connection line 4. A structure in which a plurality of polygonal lines is sequentially arranged between third connection lines 3 and fourth connecting lines 4 are formed.

In addition, as shown in FIG. 4, the shape of the microwave transmission line 120 is the same as that of the embodiment shown in FIG. 3 and will not be described in detail herein.

Figure 5:
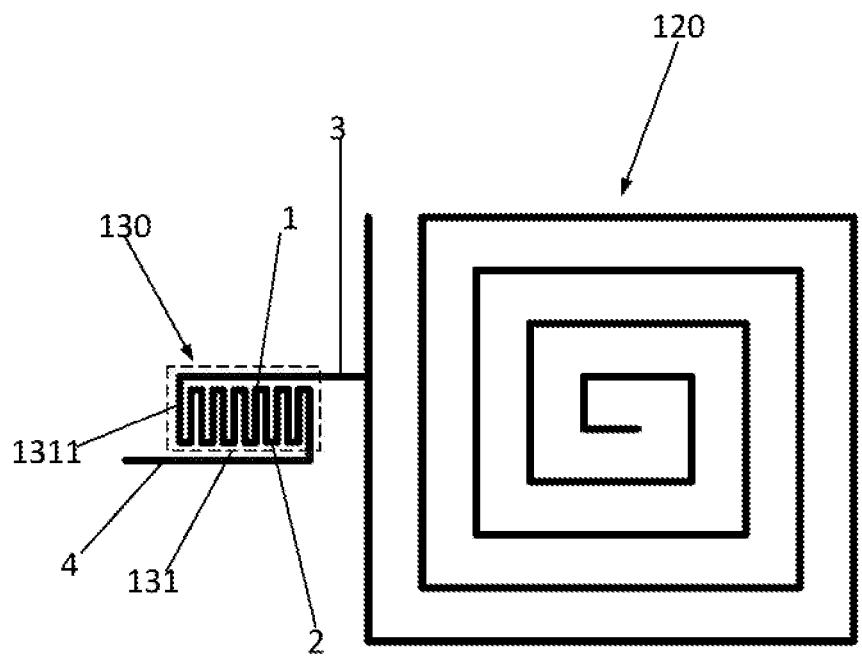
FIG. 5 is a third embodiment for illustrating a connection structure between a voltage loading line and a microwave transmission line.

As shown in FIG. 5, it is a schematic plan view of the microwave transmission line 120 and the voltage loading line 130 on the control substrate according to another embodiment of the present disclosure.

In this embodiment, similar to the above embodiment, the voltage loading line 130 is connected to the microwave transmission line 120, and the voltage loading line 130 is made as a planar inductor 131.

The planar inductor 131 includes a plurality of parallel polygonal lines 1311 that are parallel to each other. Specifically, among the multiple polygonal lines 1311, a first end of one of the polygonal lines is connected to a polygonal line adjacent to the first side through a first connection line 1, and a second end is connected to a polygonal line adjacent to the second side through a second connection line 2.

The first connection line 1 and the second connection line 2 are both perpendicular to one of the polygonal lines, and the first side is opposite to the second side.

Further, same as the embodiment shown in FIG. 4, among a plurality of polygonal lines 1311 connected in series, the first polygonal line at the end of the series connection is connected to the microwave transmission line 120 through the third connection line 3, there is a first angle between the third connection line 3 and the first polygonal line. Among the multiple polygonal lines 1311 connected in series, the second sub-loading line at the beginning of the series connection is connected to the voltage input terminal (not shown in the figure) through the fourth connection line 4, there is a second angle between the fourth connection line 4 and the second sub-loading line.

Optionally, the first angle and the second angle are less than or equal to 90 degrees and greater than 0 degrees. In the embodiment of the present disclosure, as shown in FIG. 4, the first angle and the second angle are both equal to 90 degrees.

Different from the embodiment shown in FIG. 4, the third connection line 3 is parallel to the fourth connection line 4. The planar inductor 131 is located between the third connection line 3 and the fourth connection line 4, and the length extension direction of each polygonal line 1311 is perpendicular to the third connection line 3 and the fourth connection line 4, and a plurality of polygonal lines 1311 are between the third connection line 3 and the fourth connection line 4, and are arranged in a direction parallel to the third connection line 3 and the fourth connection line 4.

In addition, as shown in FIG. 5, in this embodiment, the shape of the microwave transmission line 120 is the same as that of the embodiment shown in FIG. 3, and will not be described in detail herein.

It should be noted that, in order to ensure the passing DC and blocking AC characteristics of voltage loading line 130, the voltage loading line 130 of the above embodiments, in addition to the above shapes, also meets the following size requirements:

the line width of the microwave transmission line 120 is more than a hundred times larger than the line width of the voltage loading line;

the planar inductor comprises a polygonal line with at least 3 vertices, that is, the number of polygonal lines is greater than 6 and is perpendicular to the length extension direction of the polyline;

the line width of the planar inductor is less than or equal to 6 um;

the planar inductor comprises a plurality of portions connected end to end and parallel to each other, and a line spacing between two portions is less than or equal to 4 um.

In addition, the shapes of the voltage loading line 130 and the microwave transmission line 120 in the foregoing embodiments are merely examples, and are not limited thereto. In addition, the connection position of the voltage loading line 130 and the microwave transmission line 120 may be any position on the microwave transmission line 120, and is not limited to only a position near one end of the microwave transmission line 120, for example, it may also be located at a middle position or a corner position of the microwave transmission line 120.

In the embodiment of the present disclosure, the metal material of the voltage loading line and the microwave transmission line comprises at least one of Cu, Ag and Al.

It should be noted that, in the above embodiments, take that multiple polygonal lines 1311 are parallel to each other, and a connection line connecting adjacent polygonal lines 1311 is perpendicular to the polygonal line 1311 as a simple, the specific structure of the planar inductor 131 is exemplified, but it is not specifically limited thereto, for example, a plurality of polygonal lines 1311 may be inclined to each other at a certain angle, or an angle between a connection line connecting adjacent polygonal lines 1311 and the polygonal lines is less than 90 degrees.

Further, in the control substrate according to the embodiment of the present disclosure, the above mentioned connected microwave transmission line 120 and voltage loading line 130 are formed as a phase shifting unit, and a plurality of phase shifting units may be provided on a base substrate of the control substrate.

Figure 6:
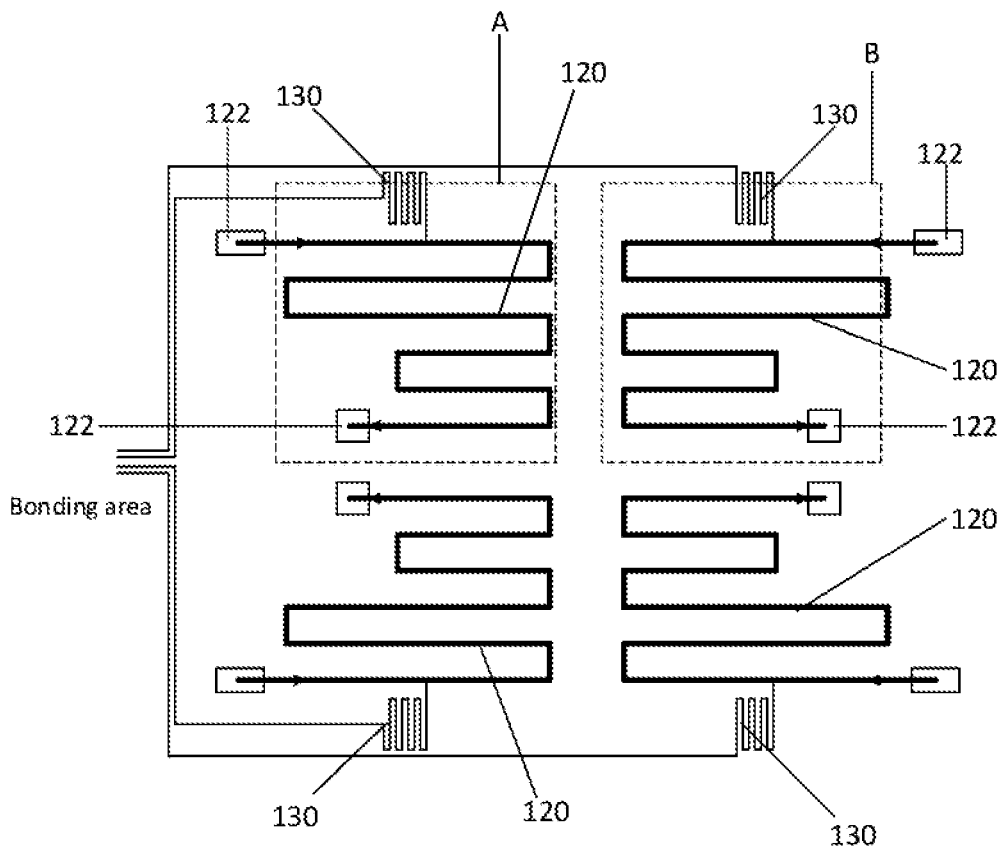
FIG. 6 is a schematic plan view of a control substrate in some embodiments of the present disclosure.

As shown in FIG. 6, each phase shifting unit includes a microwave transmission line 120 and a voltage loading line 130 connected to each other, wherein each phase shifting unit is independent of each other, and the polygonal line of voltage loading line 130 of each phase shifting unit at the beginning of the series connection extends to the bonding area, or extends to the bonding area through the connection line, and is connected to the voltage input terminal.

Optionally, in the plurality of phase shifting units on the control substrate, the bending manner, the total length, and the like of the microwave transmission line 120 are the same.

In addition, combined with FIG. 1, in one embodiment, the entire liquid crystal layer 300 can be formed as a liquid crystal cell, and a plurality phase shifting units are set corresponding to the liquid crystal cell. In another embodiment, the entire liquid crystal layer 300 may include at least two liquid crystal cells, a plurality phase shifting units are set corresponding to the at least two liquid crystal cells, optionally, phase shifting unit and liquid crystal cell shall be set one to one.

It should be noted that each liquid crystal cell includes opposite upper and lower substrates and liquid crystals located between the upper and lower substrates; wherein the upper substrates of different liquid crystal cells are located on the same plane, but are separated from each other; similarly, the lower substrates of different liquid crystal cells are located on the same plane, but separated from each other.

In each phase shifting unit, referring to FIG. 6, the base substrate of the control substrate is further provided with a feeding end 122 located at both ends of the microwave transmission line 120 for implementing input and output of a microwave signal.

Further, the liquid crystal phase shifter applied to the control substrate further includes a power feeding portion corresponding to each power feeding end, for feeding microwave signals into the microwave transmission line 120 and feeding microwave signals outside the microwave transmission line 120.

Optionally, as shown in FIG. 1, the liquid crystal phase shifter may be disposed on a side of the first base substrate 110 away from the second base substrate 210, or may be disposed on a side of the second base substrate 210 away from the first base substrate 110, and the orthographic projection of each feed portion on the plane of the first base substrate 110 and the orthographic projection of the feed end on the plane of the first base substrate overlap, so that it is ensured that the microwave signal is fed in or out on the microwave transmission line 120.

Those skilled in the art should be able to understand the structure setting and manner of the power feeding portion on the liquid crystal phase shifter, and the structure setting of the power feeding portion is not the research focus of this disclosure, and will not be described in detail here.

The liquid crystal phase shifter of the control substrate according to the embodiment of the present disclosure can realize a phase difference of a microwave signal. With reference to FIG. 6 and FIG. 1, an example is described:

In the phase shifting unit A and the phase shifting unit B, the lengths of the microwave transmission lines 120 are equal. When the microwave signal emitted by the satellite is fed into the microwave transmission line 120 of the phase shifting unit A and the phase shifting unit B through the radiating unit outside the substrate and through the power feeding section, if the microwave signal reaching the phase shifting unit A is later than the microwave signal reaching the phase shifting unit B, that is, when the phase of the microwave signal reaching the phase shifting unit B is ahead of the phase of the microwave signal reaching the phase shifting unit A. In order to ensure that the output signal after passing through the liquid crystal phase shifter increases in phase, the transmission time of the microwave signal in the phase shifting unit B must be greater than the transmission time of the microwave signal in the phase shifting unit A, that is, it is necessary to ensure that the signal transmission speed in the phase shifting unit B is lower than that in the phase shifting unit A. Therefore, a bias voltage needs to be applied between the voltage loading line 130 and the phase control electrode 220 corresponding to the phase shifting unit B, to increase the dielectric constant of the corresponding liquid crystal unit in the phase shifting unit B, and adjust the microwave transmission speed of the microwave signals in the phase shifting unit B, and synchronize the phase of the microwave signal fed by phase shift unit B with the phase of the microwave signal fed by phase shift unit A.

Therefore, according to the liquid crystal phase shifter of the control substrate described in the embodiment of the present disclosure, it is able to compensate for the phase difference of the microwave signal in the space transmission, and ensure that the microwave signal output from the signal feeding end of the liquid crystal phase shifter has the same phase superposition enhancement effect.

In the control substrate described in the embodiment of the present disclosure, the voltage loading line and the microwave transmission line are made of the same metal material, and by making the voltage loading line as a planar inductor, the leakage of the microwave signal transmitted on the microwave transmission line to the voltage loading line can be prevented. In addition to avoiding the leakage of the microwave signal from the microwave transmission line to the voltage loading line, the manufacturing process may be simplified.

A liquid crystal phase shifter is further provided in some embodiments of the present disclosure, where the liquid crystal phase shifter includes the control substrate hereinabove.

Reference to FIG. 1, the liquid crystal phase shifter further includes: a counter substrate (second base substrate 110) opposite to the base substrate (first base substrate 110), wherein a phase 220 control electrode is on the counter substrate; and a liquid crystal layer 300 between the counter substrate and the base substrate.

Specifically, using the liquid crystal phase shifter described in the embodiment of the present disclosure, when voltage is applied separately on the opposite microwave transmission line and the phase control electrode, an electric field is formed between the microwave transmission line and the phase control due to a voltage difference. The liquid crystal molecules in the liquid crystal layer are deflected under the action of the electric field, so that the dielectric constant c of the liquid crystal layer is changed.

In combination with FIG. 1 to FIG. 6, and in reference to the detailed description of the control substrate above, the technical personnel in the field should be aware of the specific structure of the liquid crystal phase shifter using the control substrate described in the embodiment of the present disclosure, and will not be detailed here.

Figure 7:
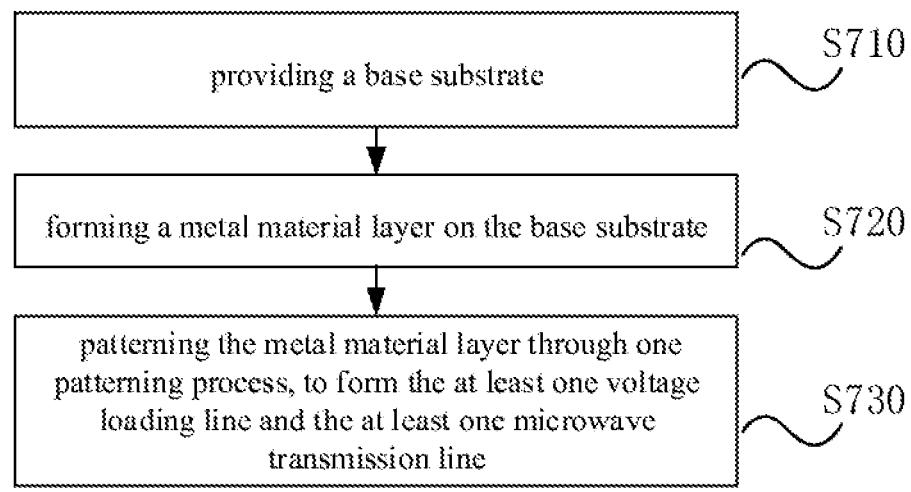
FIG. 7 is a schematic diagram of a forming process of a control substrate in some embodiments of the present disclosure.

A method of forming the control substrate hereinabove is further provided in some embodiments of the present disclosure, as shown in FIG. 7, the method includes:

S710, providing a base substrate;

S720, forming a metal material layer on the base substrate; and

S730, patterning the metal material layer through one patterning process, to form the at least one voltage loading line and the at least one microwave transmission line.

Optionally, the base substrate may be a glass material. The metal material layer may include at least one of Cu, Ag and Al, such as Cu.

In step S720, when a metal material layer is fabricated on the base substrate, it can be fabricated by a sputtering method.

Figure 8:
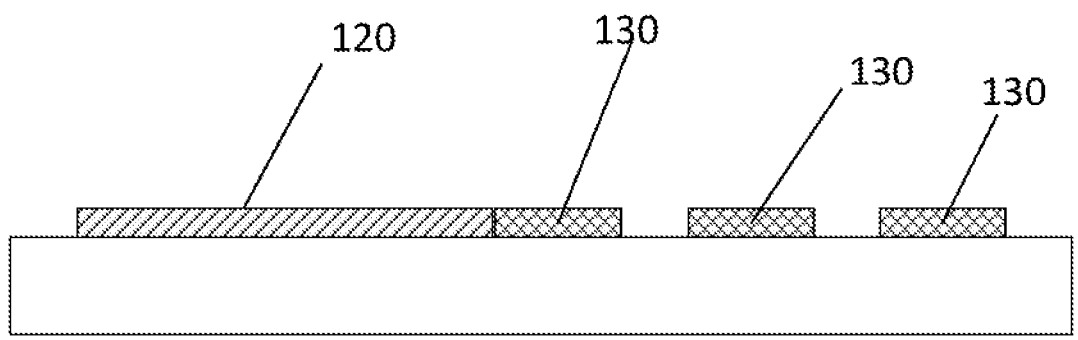
FIG. 8 is a partial profile diagram of a control substrate in some embodiments of the present disclosure.

In step S730, the voltage loading line 130 and the microwave transmission line 120 can be made in one step through a patterning process, such as using a mask for exposure, as shown in FIG. 8.

According to the detailed description of the control substrate described in the embodiment of the present disclosure, in order to realize the high impedance characteristic of the voltage loading line 130, the cross-sectional area of the microwave transmission line 120 is much larger than the cross-sectional area of the voltage loading line 130, such as the line width of the microwave transmission line 120 is more than a hundred times larger than the line width of the voltage loading line 130. Since the heights of the microwave transmission line 120 and the voltage loading line 130 relative to the substrate are generally equal, the line width of the voltage loading line 130 is much smaller than the line width of the microwave transmission line 120.

According to the control substrate, the liquid crystal phase shifter, and the method of forming the control substrate according to the embodiment of the present disclosure, the voltage loading line and the microwave transmission line can be made of the same metal material, and the voltage loading line is made into a radio frequency choke with inductance characteristics through a semiconductor process. The voltage loading line has the characteristics of passing DC and blocking AC, and has high impedance performance, thereby loading the DC voltage and avoiding the microwave signal leakage.

Therefore, according to the control substrate, the liquid crystal phase shifter, and the method of forming the control substrate according to the embodiment of the present disclosure, it is able to simplify the manufacturing process of the liquid crystal phase shifter, achieve the effect of reducing production costs and improving product performance.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only used to distinguish different components. Expressions such as "connection" or "connected" are not limited to denote physical or mechanical connections, but may include electrical connections, whether direct or indirect. "Up", "down", "left", "right", etc. are only used to indicate the relative position relationship. When the absolute position of the described object changes, the relative position relationship changes accordingly.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A control substrate, comprising a base substrate, at least one microwave transmission line and at least one voltage loading line on the base substrate, wherein the at least one microwave transmission line is in a one-to-one correspondence to the at least one voltage loading line, and an end of the at least one voltage loading line is connected to the corresponding microwave transmission line; wherein
 the at least one voltage loading line and the at least one microwave transmission line are made of a same metal material, and the at least one voltage loading line is a planar inductor,
 wherein a line width of the at least one microwave transmission line is more than a hundred times larger than a line width of the at least one voltage loading line.

2. The control substrate according to claim 1, wherein a line width of the planar inductor is less than or equal to 6 um.

3. The control substrate according to claim 1, wherein the planar inductor comprises a plurality of portions connected end to end and parallel to each other, and a line spacing between two portions is less than or equal to 4 um.

4. The control substrate according to claim 1, wherein the planar inductor comprises a polygonal line with at least 3 vertices.

5. The control substrate according to claim 1, wherein a corner between two segments of the polygonal line of the planar inductor is: 90 degrees or 135 degrees.

6. The control substrate according to claim 1, wherein the end of the at least one voltage loading line is connected to the corresponding microwave transmission line via a starting end, a middle or a corner of the corresponding microwave transmission line.

7. The control substrate according to claim 1, wherein an end of a segment of the at least one voltage loading line is connected to the corresponding microwave transmission line, and the segment is perpendicular to the corresponding microwave transmission line.

8. The control substrate according to claim 1, wherein a thickness of the at least one microwave transmission line is identical to a thickness of the at least one the voltage loading line.

9. The control substrate according to claim 1, wherein the metal material of the at least one voltage loading line and the at least one microwave transmission line comprises at least one of Cu, Ag and Al.

10. A liquid crystal phase shifter comprising the control substrate according to claim 1.

11. The liquid crystal phase shifter according to claim 10, further comprising:
 a counter substrate opposite to the base substrate, wherein a phase-control electrode is on the counter substrate; and
 a liquid crystal layer between the counter substrate and the base substrate.

12. A method of forming the control substrate according to claim 1, comprising:
 providing a base substrate;
 forming a metal material layer on the base substrate; and
 patterning the metal material layer through one patterning process, to form the at least one voltage loading line and the at least one microwave transmission line.

13. A control substrate, comprising a base substrate, at least one microwave transmission line and at least one voltage loading line on the base substrate, wherein the at least one microwave transmission line is in a one-to-one correspondence to the at least one voltage loading line, and an end of the at least one voltage loading line is connected to the corresponding microwave transmission line; wherein
 the at least one voltage loading line and the at least one microwave transmission line are made of a same metal material, and the at least one voltage loading line is a planar inductor,
 a line width of the planar inductor is less than or equal to 6 um.

14. A control substrate, comprising a base substrate, at least one microwave transmission line and at least one voltage loading line on the base substrate, wherein the at least one microwave transmission line is in a one-to-one correspondence to the at least one voltage loading line, and an end of the at least one voltage loading line is connected to the corresponding microwave transmission line; wherein
 the at least one voltage loading line and the at least one microwave transmission line are made of a same metal material, and the at least one voltage loading line is a planar inductor,
 the planar inductor comprises a plurality of portions connected end to end and parallel to each other, and a line spacing between two portions is less than or equal to 4 um.

* * * * *